(12) United States Patent
Helmreich et al.

(10) Patent No.: US 9,041,504 B2
(45) Date of Patent: May 26, 2015

(54) POLYPHASE CONVERTER WITH MAGNETICALLY COUPLED PHASES

(75) Inventors: Wolfgang Helmreich, Stuttgart-Botnang (DE); Roland Hellwig, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 203 days.

(21) Appl. No.: 13/990,717

(22) PCT Filed: Nov. 2, 2011

(86) PCT No.: PCT/EP2011/069248
§ 371 (c)(1),
(2), (4) Date: May 30, 2013

(87) PCT Pub. No.: WO2012/072359
PCT Pub. Date: Jun. 7, 2012

(65) Prior Publication Data
US 2013/0241528 A1    Sep. 19, 2013

(30) Foreign Application Priority Data

Dec. 1, 2010 (DE) .......................... 10 2010 062 240

(51) Int. Cl.
*H01F 27/28* (2006.01)
*H02M 3/02* (2006.01)
(Continued)

(52) U.S. Cl.
CPC ............ *H02M 3/02* (2013.01); *H01F 2038/026* (2013.01); *H02M 3/1584* (2013.01); *H02M 7/003* (2013.01)

(58) Field of Classification Search
CPC ..... H02M 3/02; H02M 7/003; H02M 3/1584; H01F 2038/06

USPC ......... 323/222, 224, 271, 272, 277, 290, 285, 323/282; 363/16–19, 21.01, 65; 336/65, 83, 336/170, 178, 183, 212, 215, 221

See application file for complete search history.

(56) References Cited

U.S. PATENT DOCUMENTS 7,005,835 B2 * 2/2006 Brooks et al. ............... 323/282
7,233,132 B1 * 6/2007 Dong et al. .................. 323/272
(Continued)

FOREIGN PATENT DOCUMENTS

CN   101243604    8/2008
DE   19500943 C1  5/1996
(Continued)

OTHER PUBLICATIONS

International Search Report for Application No. PCT/EP2011/069248 dated Jan. 23, 2012 (3 pages).

*Primary Examiner* — Rajnikant Patel
(74) *Attorney, Agent, or Firm* — Michael Best & Friedrich LLP

(57) ABSTRACT

Polyphase converter, comprising a plurality of electrical phases (11 to 16), which can each be driven by switching means (21 to 26), wherein at least one coupling means (31 to 39) is provided, which magnetically couples at least one first phase (11) to at least one further phase (12, 14, 16), wherein at least two phases (11, 12) to be coupled are surrounded at least partially by the coupling means (31), wherein at least one insulating body (72) is provided, which on the upper or lower side thereof accommodates the phases (11 to 16) to be coupled and on which at least one fastening means (74, 76, 90) is provided, which interacts with at least one of the phases (11 to 16) for fastening purposes.

18 Claims, 13 Drawing Sheets

(51) Int. Cl.
*H02M 3/158* (2006.01)
*H02M 7/00* (2006.01)
*H01F 38/02* (2006.01)

(56) References Cited

U.S. PATENT DOCUMENTS

| | | | |
|---|---|---|---|
| 7,352,269 B2 * | 4/2008 | Li et al. | 336/170 |
| 7,864,015 B2 * | 1/2011 | Hansen et al. | 336/200 |
| 8,081,492 B2 * | 12/2011 | Nakahori | 363/16 |
| 8,179,116 B2 * | 5/2012 | Wei et al. | 323/331 |
| 8,264,073 B2 * | 9/2012 | Standing | 257/685 |
| 2008/0303495 A1 | 12/2008 | Wei et al. | |
| 2009/0179723 A1 | 7/2009 | Ikriannikov et al. | |

FOREIGN PATENT DOCUMENTS

| | | |
|---|---|---|
| DE | 10039890 A1 | 3/2001 |
| EP | 1145416 B1 | 10/2001 |
| WO | 2009/114873 A1 | 9/2009 |

\* cited by examiner

POLYPHASE CONVERTER WITH MAGNETICALLY COUPLED PHASES

BACKGROUND OF THE INVENTION

The invention starts from a polyphase converter. A polyphase converter of the kind described is disclosed, for example, in WO 2009/114873 A1. The DC/DC converter described therein comprises a coil with non-linear inductive resistance, a switching system and an output filter. At the same time, adjacent phases are coupled to one another.

A converter for converting electrical energy has already been disclosed in EP 1145416 B1. Here, it is proposed that the choke size can be reduced by the use of coupled inductances. In doing so, the coupled chokes must be sized so that the load currents of the sub-branches mutually compensate one another and lead to no magnetic loading of the chokes. Only the difference current between the individual sub-branches then gives rise to a magnetic field.

A planar transformer has already been disclosed in DE 10039890 A1. A carrier body made of plastic contains a plurality of printed circuit tracks which are layered on top of one another and which are in the form of stamped and folded metal sheets. At the same time, the printed circuit tracks are arranged within the plastic carrier body in such a way that the plastic acts in an insulating manner between the printed circuit tracks. In addition, the carrier body contains windings which form a primary and a secondary winding of a planar transformer.

A planar transformer for switch mode power supplies has already been disclosed in DE 19500943 C1. A plastic film is initially provided with openings and cutouts for feeding through the side legs and the middle leg of the magnetic core. The plastic film is pressed with the two windings and subsequently injection-molded with plastic compound. A plurality of carrier plates are stacked together. After the magnetic cores have been fitted, the assembly unit is injection-molded with an insulating plastic compound.

It is the object of the present invention to specify a polyphase converter which is distinguished by ease of manufacture and further reduction in the installation space, in particular as a result of lower volume of the coupling means, and the ability to be easily controlled.

SUMMARY OF THE INVENTION

In contrast, the polyphase converter has the advantage of a cost-effective and simple structure of the polyphase converter from a manufacturing point of view, as in particular two-dimensional phase forms can be used. The coupling means can also be arranged in the form of a matrix. The corresponding polyphase converter thus enables a complex three-dimensional structure to be avoided. As at least one insulating body, which accommodates the phases to be coupled on the upper side and underside thereof and on which is provided at least one fixing means which interacts with at least one phase for fixing purposes, is provided, a plurality of functions can be realized. The insulating body undertakes the fixing of the phases or coupling means which are to be arranged in different ways and the insulation of the phases from one another in a particularly advantageous manner from a manufacturing point of view. This is because only a pre-assembled insulating body has to be overlaid with the appropriately arranged coupling means.

In an expedient improvement, it is provided that the insulating body has at least one cutout for accommodating at least one coupling means. This enables a correctly positioned assembly of the coupling means to be achieved while at the same time insulating the coupling means from the phases arranged on the insulating body.

In an expedient improvement, a carrier, which has at least one mounting surface for accommodating the coupling means, is provided. This enables the coupling means to be accurately pre-assembled in position so that only the carrier has to be brought together with the insulating body to form the polyphase converter. For this purpose, the carrier particularly preferably has at least one fixing means for fixing the carrier to the coupling means, to the insulating body or to a printed circuit board. Particularly preferably, the fixing means of the carrier interacts with a retaining part for fixing the coupling means to the carrier. The retaining part can fix a plurality of parts of a plurality of coupling means simultaneously, thus enabling the assembly effort to be reduced. In addition, the retaining part could be designed as spring means, for example made of spring steel sheet, so that, particularly in the case of a two-part coupling means, the parts are pressed against one another by the retaining part, thus reducing air gaps between the parts of the coupling means.

In an expedient improvement, the mounting surface of the carrier is designed so that the coupling means only partially rests on the carrier. The surface of the coupling means which does not rest on the carrier can be used for cooling by means of air circulation for example. In an expedient improvement, the carrier has at least one guide means which interacts with the coupling means for guidance purposes. This enables the coupling means to be assembled accurately in position particularly easily without the need for further aids.

In an expedient improvement, it is provided that at least two phases, preferably three phases, are arranged spatially in a first plane on the upper side of the carrier and that at least two further phases, preferably three further phases, run spatially in a second plane on the underside of the carrier. This spatial arrangement enables the phases to be insulated and mounted particularly easily.

In an expedient improvement, it is provided that at least one phase is designed in a U-shape, as a rectangle and/or in a meandering fashion. In a particularly expedient improvement, it is provided that the phase arranged on the one side of the carrier is designed in a U-shape and the phase arranged on the opposite side of the carrier is designed in a meandering fashion. These geometrical forms can be produced very easily and enable a simple magnetic coupling in that parallel and spaced-apart phase sections can be encompassed by coupling means.

In an expedient improvement, it is provided that the fixing means of the insulating body has at least one hook which interacts with at least one opening or one side edge of one phase. This enables a lateral movement for correct positioning purposes. In an expedient improvement, it is provided that a fixing means of the insulating body interacts with a side edge on the fold-down region of the phase. In particular, this promotes a positionally correct and rapid assembly of the phases.

In an expedient improvement, the insulating body has webs for electrically insulating the phases from one another and with respect to the coupling means. This increases safety against undesirable short circuits.

In an expedient improvement, the web is arranged between two fold-down regions of two adjacent phases. This enables the space required by the polyphase converter to be further reduced, as the web ensures that adjacent phases are electrically insulated and at the same time fixes their position relative to one another with a small spacing.

In an expedient improvement, it is provided that the fixing means of the carrier is arranged between cutout and phase. This reliably prevents an electrically conducting contact between phase and coupling means while at the same time fixing phase and/or coupling means.

In an expedient improvement, it is provided that the fixing means of the insulating body interacts with at least one stop surface of the phase. This ensures a positionally correct assembly of the phase relative to the insulating body.

In an expedient improvement, it is provided that the phases are constructed as punched grids and/or as part of a printed circuit board. This type of manufacture is particularly cost-effective. When at least some of the phases are integrated in a printed circuit board, further electronic components such as the switching means can be arranged there.

In an expedient improvement, it is provided that the phases are in the form of punched grids. This type of manufacture is distinguished by favorable manufacturing costs. Here, with a six-phase system, three phases can be rectangular and three phases U-shaped. Essentially, the same geometrical forms can be used, thus further reducing the cost of manufacture.

In an expedient improvement, it is provided that at least two phases to be coupled are enclosed at least partially by a coupling means, wherein the phases to be coupled can preferably be driven with different current directions. Preferably, the phases to be coupled run approximately parallel to one another at least in part in the region which is enclosed by the coupling means. In a particularly expedient improvement, it is provided that the coupling means encloses at least two phases to be magnetically coupled in a first region and in a second region in each case. This chosen type of coupling enables standard parts, such as planar ferrite cores for example, to be used as coupling means. These could have a rectangular or double rectangular cross section. In an expedient improvement, it is provided that the coupling means are arranged in the form of a matrix. Particularly in the case of a rectangular external contour of the coupling means, with the proposed coupling with six phases, the new coupling means required can be arranged in the form of a matrix (3×3) and therefore in a space-saving and planar manner. In an expedient improvement, it is provided that the coupling means comprises at least two parts, wherein one of the parts has a U-, O-, I- or E-shaped cross section. This construction enables the phases to be coupled to be encompassed by the coupling means particularly easily. In an expedient improvement, it is provided that a gap, preferably an air gap, is provided between two parts. The inductance can be influenced particularly easily in this way. In an expedient improvement, it is provided that a plurality of coupling means consisting of at least two parts have at least one common part, preferably a metal plate. This could enable the assembly to be simplified, as all coupling means could be closed in only one step by fitting the plate.

In an expedient improvement, it is provided that one phase is coupled to a further phase in order to at least partially compensate the DC component of the current characteristic. In a particularly expedient improvement, it is provided that one phase is magnetically coupled to at least one further phase which is driven essentially with a phase shift of about 180°. This results in a particularly strong compensation of the direct fields, thus enabling the magnetic drive amplitude to be further reduced. As a further consequence, the coupling means can become smaller and an air gap can be dispensed with. This type of coupling of the phases enables the coupling means to be provided in a geometrically advantageous matrix arrangement. This is distinguished by simple construction, the use of simple coupling means such as planar ferrite cores and low spatial expansion. Filters can also be reduced in size.

In an expedient improvement, it is provided that the switching means drive the phases sequentially and that one phase is magnetically coupled to at least one further phase which is driven immediately before and/or afterwards. In a particularly expedient improvement, it is provided that one phase is magnetically coupled to at least one further phase, the switch-on or switch-off instant of which is immediately before and/or afterwards. In an expedient improvement, it is provided that one phase is magnetically coupled to at least two further phases which in each case are driven immediately before and afterwards. These forms of drive result in relatively simple current characteristics which can therefore also be relatively easily controlled.

In an expedient improvement, it is provided that three coupling means are provided in order to magnetically couple one of the phases to three further phases. In a particularly expedient improvement, it is provided that exactly six phases are provided, wherein the coupling means magnetically couple each of the six phases to three further of the six phases. On the one hand, this type of coupling guarantees that the individual phases can still be driven independently of one another. In addition, the reliability of the polyphase converter can be increased due to the stronger cross-linking of the phases.

The magnetic coupling of one phase to at least three further phases enables a troublesome mutual influencing of the phases to be minimized. In doing so, the phases to be coupled are chosen so that an optimum compensation can be achieved. This is carried out particularly by means of an opposing current profile. The objective here is to magnetically couple the phases such that the resulting magnetic field is minimized as a result of the coupled phases. This enables a small coupling means from the point of view of installation space, such as a ferrite core for example, to be reverted to for coupling the magnetic fluxes. Appropriate coupling could enable the magnetic field to be greatly reduced, so that the size of the appropriate coupling means, for example a ferrite core, can also be reduced correspondingly. With the proposed coupling, the phases can be driven in sequence. In doing so, relatively simple and therefore easily controllable current characteristics are produced. In a particularly expedient manner, in an arrangement with six phases, one phase is coupled to the two in each case adjacent phases and also to a phase which is shifted by 180 degrees. An adjacent phase is understood to be one which is driven immediately before or afterwards. In addition, with the proposed magnetic coupling, the individual phases can be driven independently of one another.

As coupling means which magnetically couple at least one phase to at least three further phases are provided, the reliability can also be increased, as an increased cross-linking of the phases is achieved due to the at least triple coupling so that the failure of one phase cannot still lead to unsafe operating conditions.

In an expedient improvement, it is provided that phases which have approximately opposing current characteristics are coupled to one another. This results in a strong compensation of the direct fields, thus enabling the magnetic drive amplitude to be further reduced. As a further consequence, the coupling means can become smaller and an air gap can be dispensed with.

In an expedient improvement, it is provided that at least two, in particular three, coupling means are provided in order to magnetically couple one of the phases to two further phases, wherein at least one of the two coupling means has a lower inductance than the other coupling means. Different aspects can be influenced and optimized by selective choice of the inductance of the coupling means. On the one hand, the inductance affects the power loss and therefore also the heat developed in the coupling means. A reduction in inductance also reduces the power loss. A smaller inductance can also be used for saturation protection. As a result, coupling means with lower inductance do not saturate until later at higher currents so that, in the event of a fault, the polyphase converter can be operated even longer in a stable operating state. On the other hand, a high inductance reduces the current ripple, i.e. the undulation of the current. The loss distribution, saturation behavior and current ripple can therefore be optimized by choosing the appropriate inductance.

In an expedient improvement, it is provided that the coupling means which couples one phase to a phase which is driven essentially with a phase shift of about 180° has a smaller inductance than at least one of the other coupling means. As a result, these coupling means which are usually more highly loaded can be reduced with regard to losses, so that less heat is also developed.

In an expedient improvement, it is provided that three coupling means are provided in order to magnetically couple one of the phases to three further phases, wherein at least one of the three coupling means has a lower inductance than the other two coupling means. For one phase, this realizes a saturation protection which has a positive effect on the system stability. Expediently, a coupling means with lower inductance should be provided for each of the preferably six phases.

In an expedient improvement, it is provided that the coupling means is provided with an air gap. This enables the inductance of the coupling means to be influenced in a particularly easy manner. If an air gap is provided with an otherwise identical design of the coupling means, the inductance is reduced compared with the version without air gap. This can be carried out particularly expediently in that the middle of the three legs of the coupling means is shortened relative to the two outer legs so that an air gap is formed there.

BRIEF DESCRIPTION OF THE DRAWINGS

Several exemplary embodiments are shown in the figures and are described in more detail below.

In the drawings.

DETAILED DESCRIPTION

Figure 1:
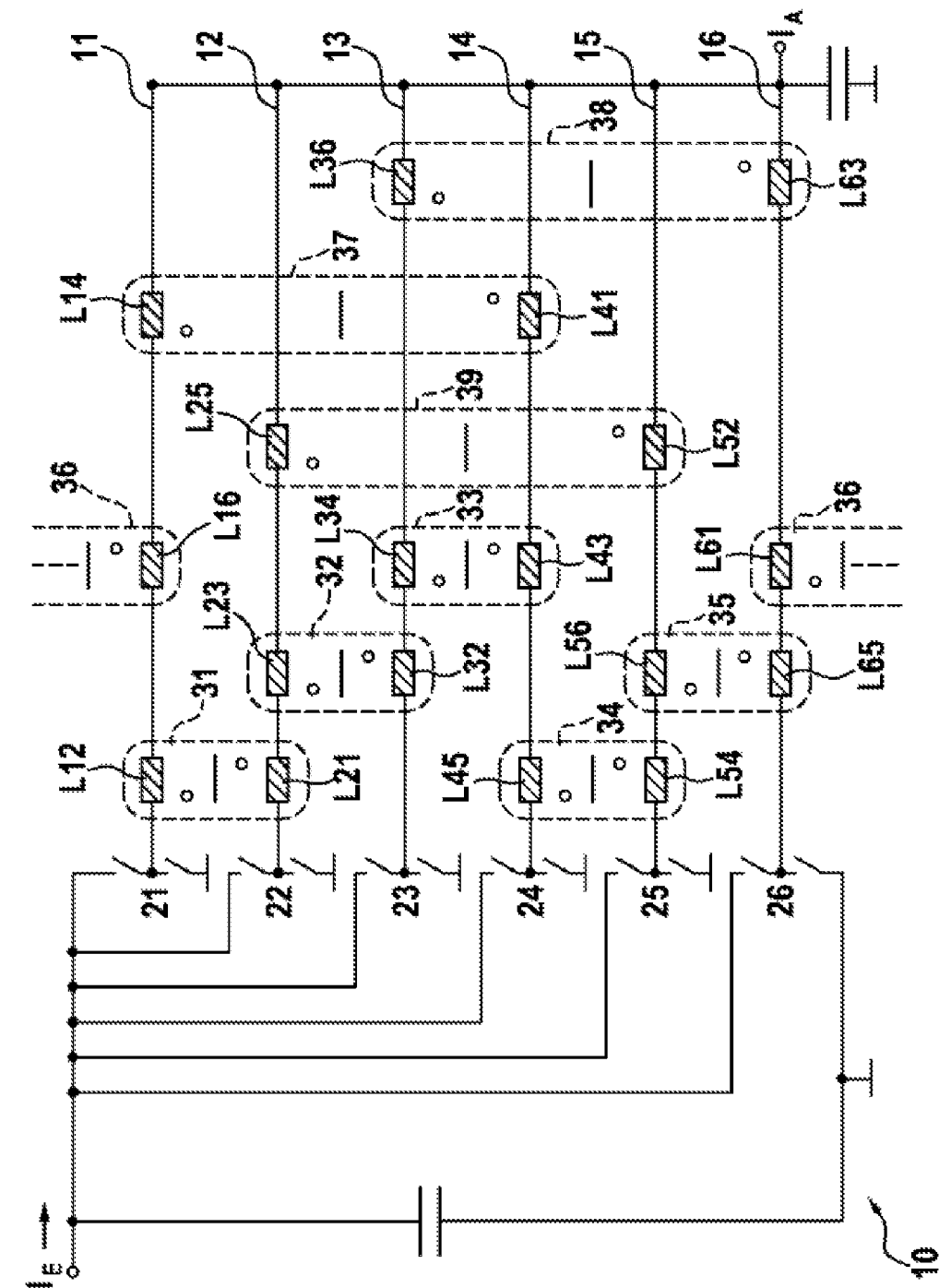
FIG. 1 shows a circuit arrangement.

The construction of a polyphase converter 10 is shown in FIG. 1 by means of a circuit. The polyphase converter 10 described here by way of example consists of six phases 11 to 16. Each of the phases 11 to 16 can be driven individually by corresponding switching means 21 to 26, each consisting of a high-side switch and a low-side switch. Due to magnetic coupling to three further phases, each current of the phases 11 to 16 flows through three inductances Lxx which form the corresponding coupling means 31 to 39. A first coupling means 31 magnetically couples the first phase 11 to the second phase 12, thus resulting in an inductance L12 for the first phase 11 and an inductance L21 for the second phase 12. A sixth coupling means 36 magnetically couples the first phase 11 to the sixth phase 16, thus resulting in an inductance L16 for the first phase 11 and an inductance L61 for the sixth phase 16. A seventh coupling means 37 magnetically couples the first phase 11 to the fourth phase 14, thus resulting in an inductance L14 for the first phase 11 and an inductance L41 for the sixth phase 16. A second coupling means 32 magnetically couples the second phase 12 to the third phase 13, thus resulting in an inductance L23 for the second phase 12 and an inductance L32 for the third phase 13. A ninth coupling means 39 magnetically couples the second phase 12 to the fifth phase 15, thus resulting in an inductance L25 for the second phase 12 and an inductance L52 for the fifth phase 15. A third coupling means 33 magnetically couples the third phase 13 to the fourth phase 14, thus resulting in an inductance L34 for the third phase 13 and an inductance L43 for the fourth phase 14. An eighth coupling means 38 magnetically couples the third phase 13 to the sixth phase 16, thus resulting in an inductance L36 for the third phase 13 and an inductance L63 for the sixth phase 16. A fourth coupling means 34 magnetically couples the fourth phase 14 to the fifth phase 15, thus resulting in an inductance L45 for the fourth phase 14 and an inductance L54 for the fifth phase 15. A fifth coupling means 35 magnetically couples the fifth phase 15 to the sixth phase 16, thus resulting in an inductance L56 for the fifth phase 15 and an inductance L65 for the sixth phase 16.

An input current $I_E$ is distributed between the six phases 11 to 16. At the input, a capacitor is connected to ground as a filter means. The outputs of the phases 11 to 16 are brought together at a common summation point and connected to ground by means of a capacitor, which is not described in more detail, as a filter means. The output current $I_A$ is then present at the common summation point on the output side. The inductances Lxx, which in each case are coupled to one another, are oriented with different winding directions from one another, as indicated by the corresponding dots in FIG. 1.

Figure 2:
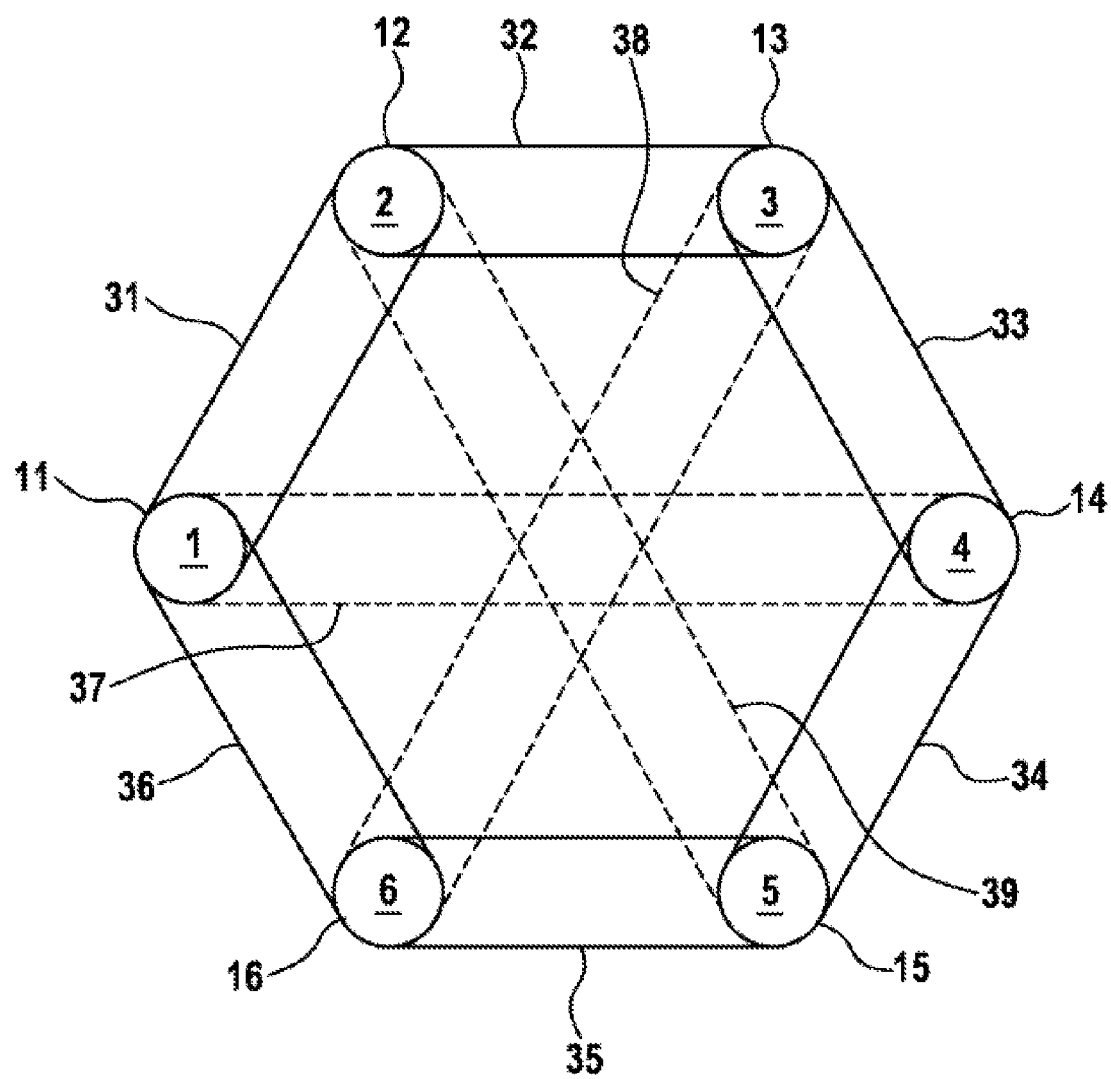
FIG. 2 shows a schematic diagram of the respective coupling of the phases.
Figure 7:
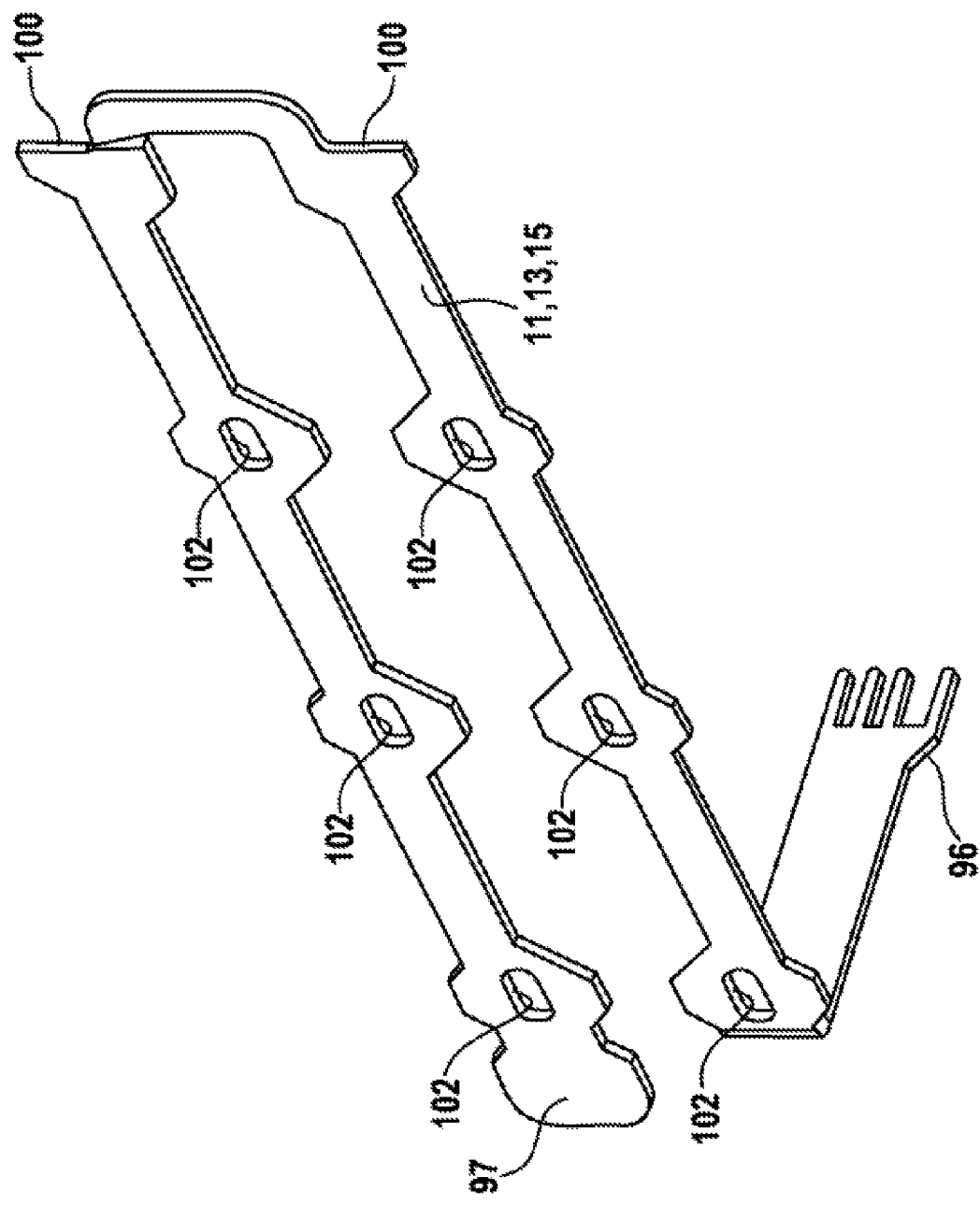
FIG. 7 shows a perspective view of a further exemplary embodiment of the first, third and fifth phase.

FIG. 2 shows systematically how the six phases 11 to 16 are coupled to one another by corresponding coupling means 31 to 39. As already described in conjunction with FIG. 1, both adjacent phases and, in addition, the phase which is offset by 180 degrees are coupled to one another. An adjacent phase is understood to be one which is driven immediately before or afterwards in time, i.e. its switch-on instants are immediately before or afterwards in time. In the exemplary embodiment, the designation of phases 11 to 16 is chosen so that the phases 11 to 16 are driven successively in accordance with the numbering, that is to say in the following order (particulars correspond to the phase references): 11-12-13-14-15-16-11 etc., each phase-shifted by 60 degrees or by T/6 (360 degrees/ number of phases), wherein T represents the period of a drive cycle. This sequence is also shown in FIG. 2 and FIG. 7. That is to say, the starting times for the different phases 11 to 16 are phase-shifted by 60 degrees in each case or shifted in time by T/6 in each case. Although, in FIG. 7, the respective phase is switched off again after the time duration T/6 (PWM ratio 1/6), the switch-off could be earlier or later depending on the desired voltage ratio up to permanently on Te, depending on the desired PWM signal (between 0% (permanently off, Te=0) and 100% (permanently on, Te=T), based on a period T).

Figure 3:
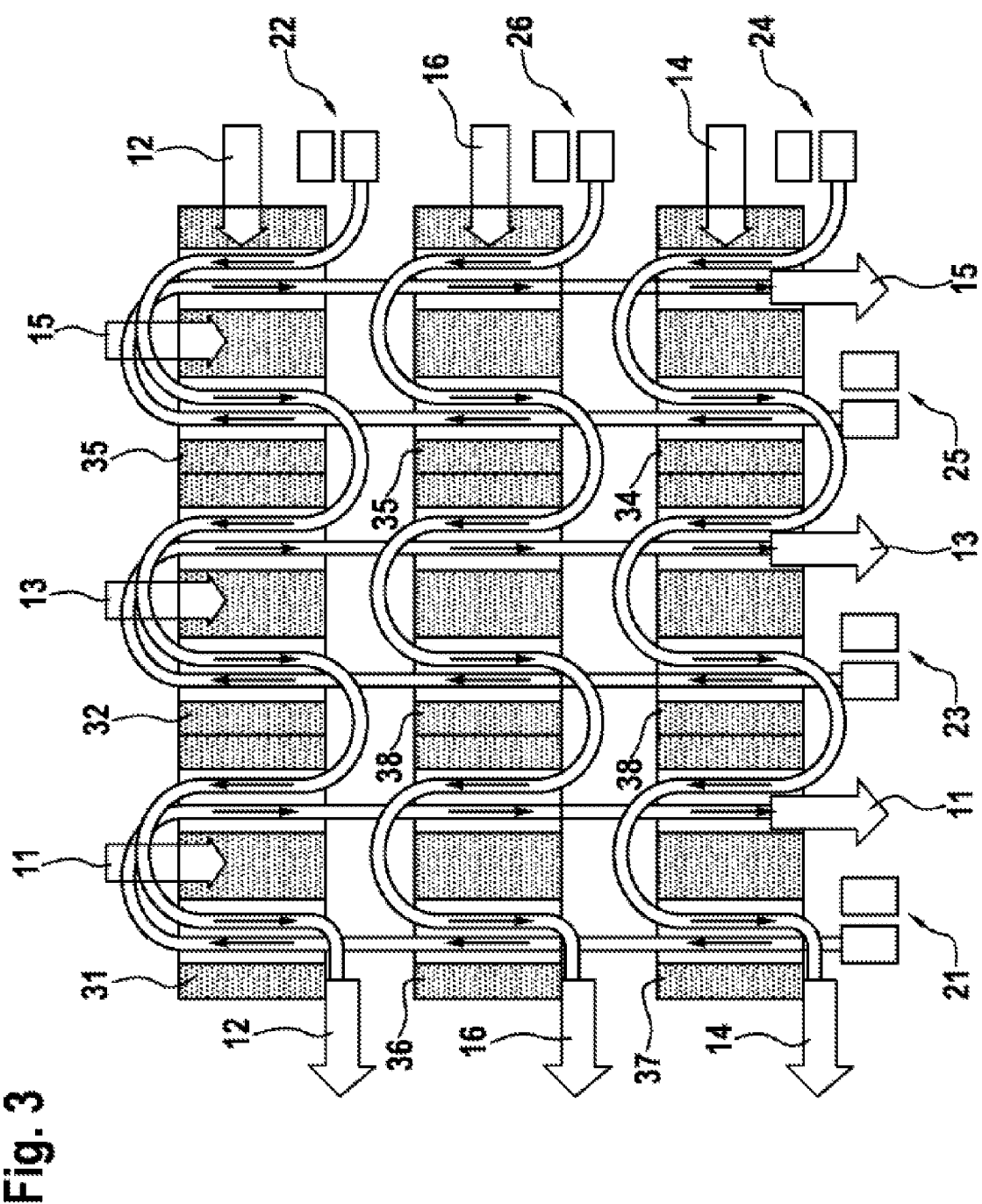
FIG. 3 shows the spatial arrangement of the different phases and coupling means.

The matrix-like spatial construction of the concept shown in FIG. 2 is now shown schematically in FIG. 3. Here, the coupling means 31 to 39 are preferably in the form of planar coil cores, for example ferrite cores, which each have two hollow cavities. Two conductors or phase sections of two phases to be coupled, which have different current directions in these sections as indicated by the arrows, are enclosed in each case in these hollow cavities of the coupling means 31 to 39.

Figure 5:
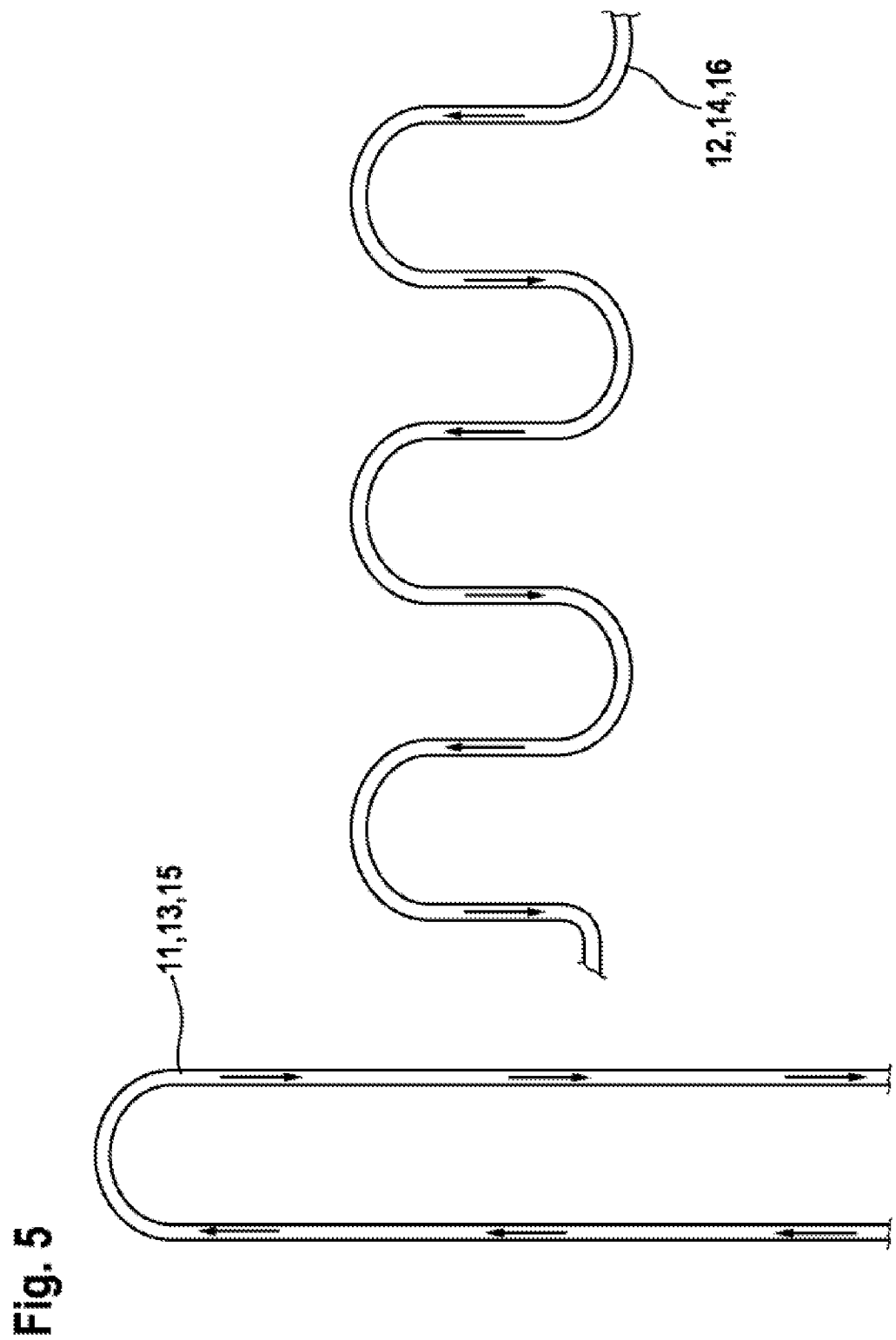
FIG. 5 shows two typical embodiments of the phases according to the exemplary embodiment of FIG. 3.

Two geometrical forms of the phases 11 to 16 and busbars or conductors of the phases 11 to 16 can also be made out by referring to FIG. 5. The first phase 11, third phase 13 and fifth phase 15 are U-shaped. These three phases 11, 13, 15 preferably all run in the same plane. The second, fourth and sixth phase 12, 14, 16 run in a further spaced-apart and parallel plane—at the top in the exemplary embodiment according to FIG. 3. Second, fourth and sixth phase 12, 14, 16 are formed as a rectangle or in meandering fashion. In doing so, they are arranged so that they are enclosed with the respective U-shaped phase 11, 13, 15 to be coupled in each case in the respective coupling means 31 to 39 with different current direction.

Figure 4:
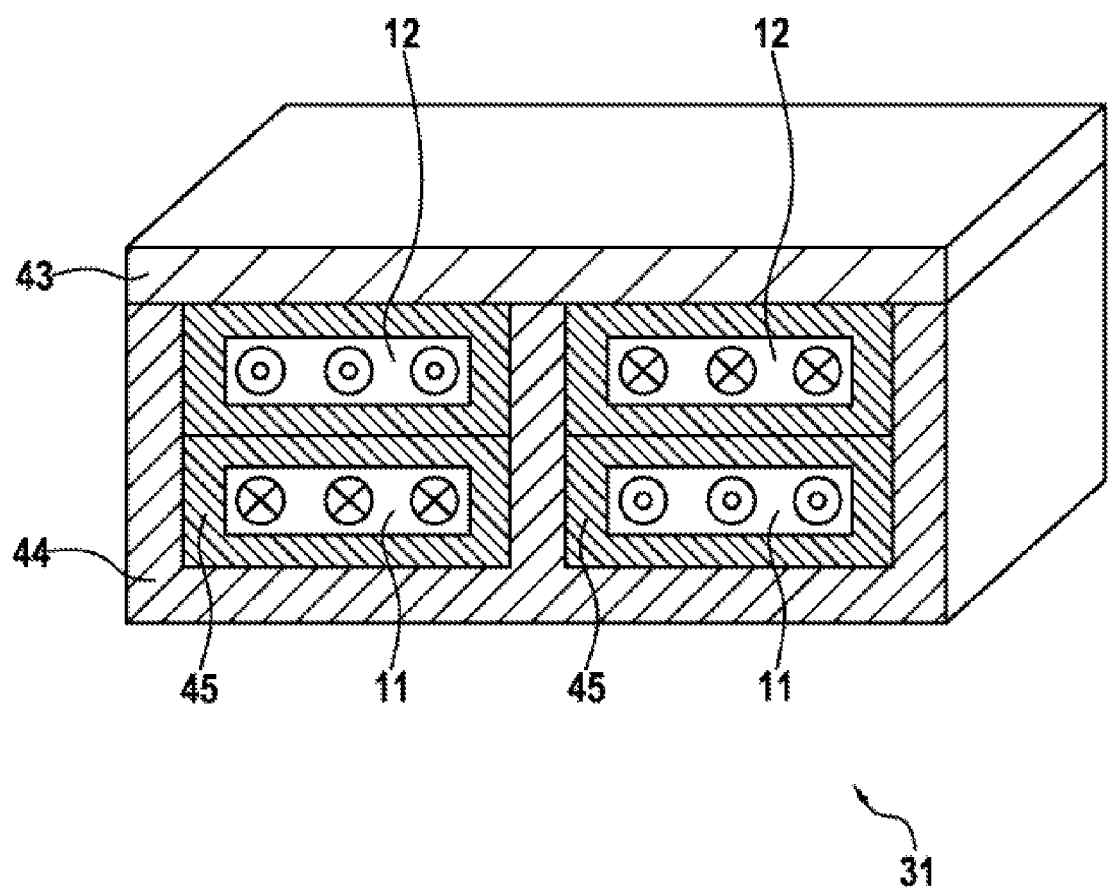
FIG. 4 shows a section through a coupling means with two coupled phases.

The coupling shown in FIG. 3 is explained by way of example with reference to the section diagram in FIG. 4 based on the first phase 11 and the second phase 12. The first coupling means 31 consists of an E-shaped first part 44 and a plate-shaped second part 43 which form the coil cores. The legs of the first part 44 with E-shaped cross section are all the same length so that they can be closed by the plate-shaped (I-shaped cross section) second part 43 without an air gap. The preferably strip-shaped section of the first phase 11 is fitted in the lower region of the coupling means 31 in each case. These sections of the first phase 11 shown lie in the same plane and are therefore planar with one another. The current direction corresponds to that current direction indicated by arrows in FIG. 3. The second phase 12, preferably likewise in the form of a strip, is now placed in the region of the first coupling means 31 above it in each case. On the other side of the first coupling means 31, first and second phase 11, 12 are fed through in its further hollow cavity, in each case in the opposite current direction to the current direction in the other hollow cavity. In the case of the first coupling means 31, this occurs in that both the first phase 11 and the second phase 12 are fed back again through the other hollow cavity at the top face of the first coupling means 11 in a 180-degree bend. The two sections of the second phase 12, which are enclosed by the first coupling means 31, are also located in the same plane and are therefore planar. The plane of the first phase 11 and the plane of the second phase 12 are parallel and spaced apart from one another at least in the inner region of the first coupling means 31.

The first phase 11 and the second phase 12 are now magnetically coupled to one another by the first coupling means 31. The indicated antiparallel current feed enables the resulting magnetic field to be kept as small as possible so that the size of the coupling means 31 can be minimized. In addition, an insulation 45 is provided between the first phase 11 and the second phase 12 in each case for electrically isolating the two phases 11, 12 from one another and in each case from the coupling means 31.

In the same way, the second phase 12 is coupled to the third phase 13 by the second coupling means 32. In addition, the second phase 12 is coupled to the fifth phase 15 by means of the ninth coupling means 39. The further corresponding couplings can be seen in FIG. 3 and are not specifically described again.

Figure 6:
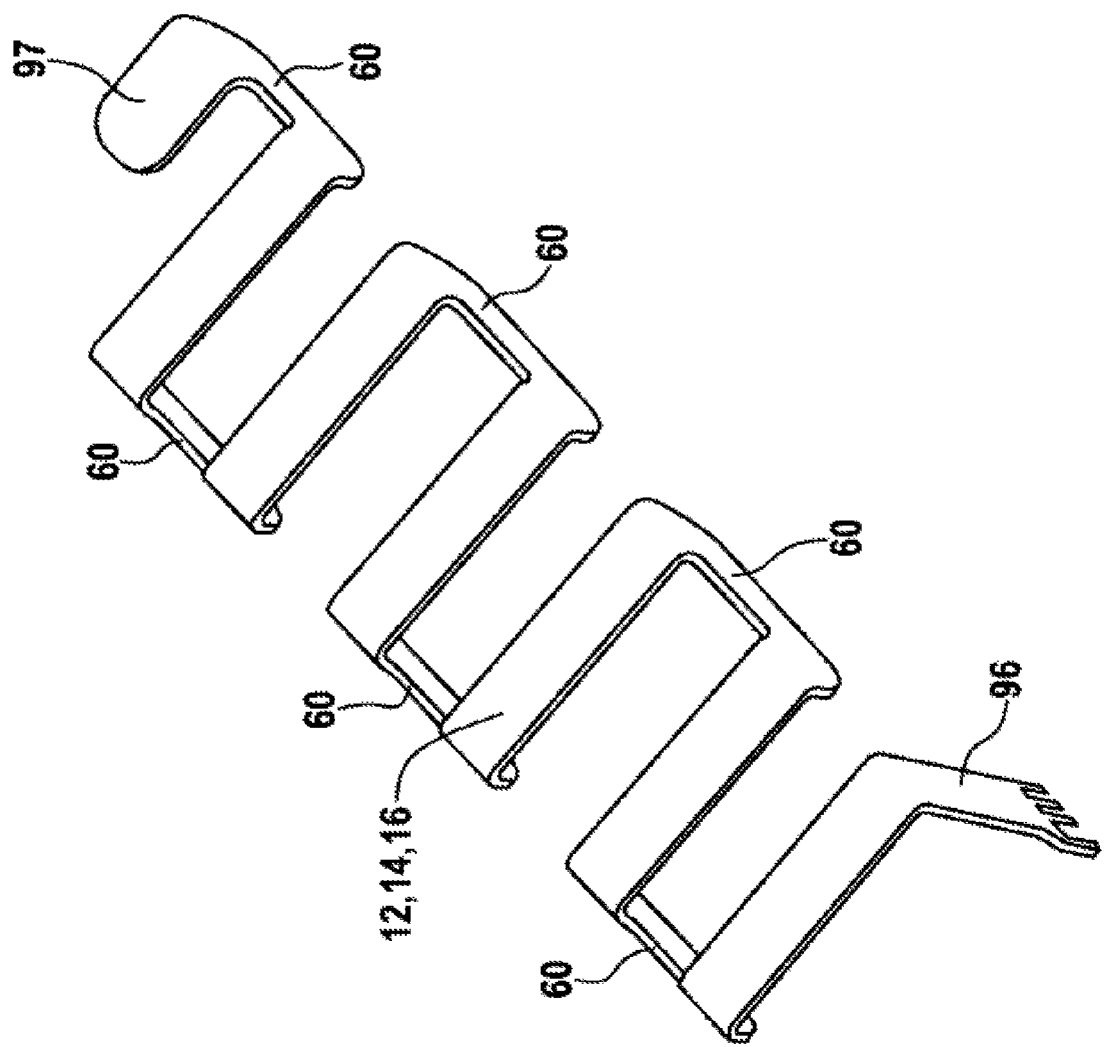
FIG. 6 shows a perspective view of a further exemplary embodiment of the second, fourth and sixth phase.

A perspective diagram of an alternative exemplary embodiment of the meandering or S-shaped second, fourth and sixth phase 12, 14, 16 respectively is shown in FIG. 6. The meandering phases 12, 14, 16 run substantially in one plane. However, they have fold-down regions 60 which are oriented at right angles to the main plane. These fold-down regions 60 are angled at approx. 90° with respect to the main plane and in each case are arranged alternately offset to the sides. In each case, they connect the sections which lie in the main plane. The regions of the busbars of the meandering phases 12, 14, 16 which lie in the main plane are encompassed by the coupling means 31 to 39 together with sections of the respective U-shaped phases 11, 13, 15, the main plane of which is oriented parallel and spaced-apart from that of the meandering phases 12, 14, 16. The design of the fold-down regions 60 contributes to reducing the space required by the polyphase converter 10, as the adjacent meandering phases 12 and 16 and 16 and 14 respectively can now move closer together as can be seen from FIG. 10 for example. The printed circuit tracks of the meandering phases 12, 14, 16 are in particular in the form of strips. The transitions of the sections of the busbars of the main plane to the fold-down regions 60 are rounded at the sides.

A connector 96 for applying current to the phases 12, 14, 16 is provided likewise at right angles to the main plane of the meandering phases 12, 14, 16. A connecting surface 97 for connecting to a busbar 94 is provided on the opposite side to the connector 96 lying in the main plane. Starting with the connector 96, which is oriented at right angles to the main plane, the strip-shaped busbar is merely changed in its direction on reaching the main plane by folding down through 90° and then runs in the main plane to the left as far as the first left-hand fold-down region 60. This is also folded down through 90° so that the narrow side surface of the busbar is oriented parallel to the main plane. The fold-down region also has two direction changes of the busbars, in each case through 90°, in order to achieve the desired meandering or S-shaped structure. After the second direction change of the busbar and after further folding down, this again runs in the main plane from left to right until a further right-hand fold-down region 60 is connected by means of a fold. This is repeated, resulting in six busbar sections running in the main plane which in each case are connected at the sides by three or two fold-down regions 60 respectively. The last, rear fold-down region 60 connects the last busbar section, which runs in the main plane, to the connecting surface 97, which likewise runs in the main plane.

A further alternative embodiment of the U-shaped first, third and fifth phase 11, 13, 15 respectively is shown in the exemplary embodiment according to FIG. 7. On the one hand, openings 102, which are preferably in the form of an oval, are provided to optimize the assembly of these U-shaped phases 11, 13, 15. Stop surfaces 100, which are preferably straight and which can interact with fixings 90 of an insulating body 72 and which project slightly at the side, are formed on the side of the U-shaped connection. The connector 96 for supplying current is again oriented at right angles to the main plane of the U-shaped phase 11, 13, 15. A connecting surface 97, which runs flat in the main plane for connecting to the busbar 94, is provided on the other side.

Figure 8:
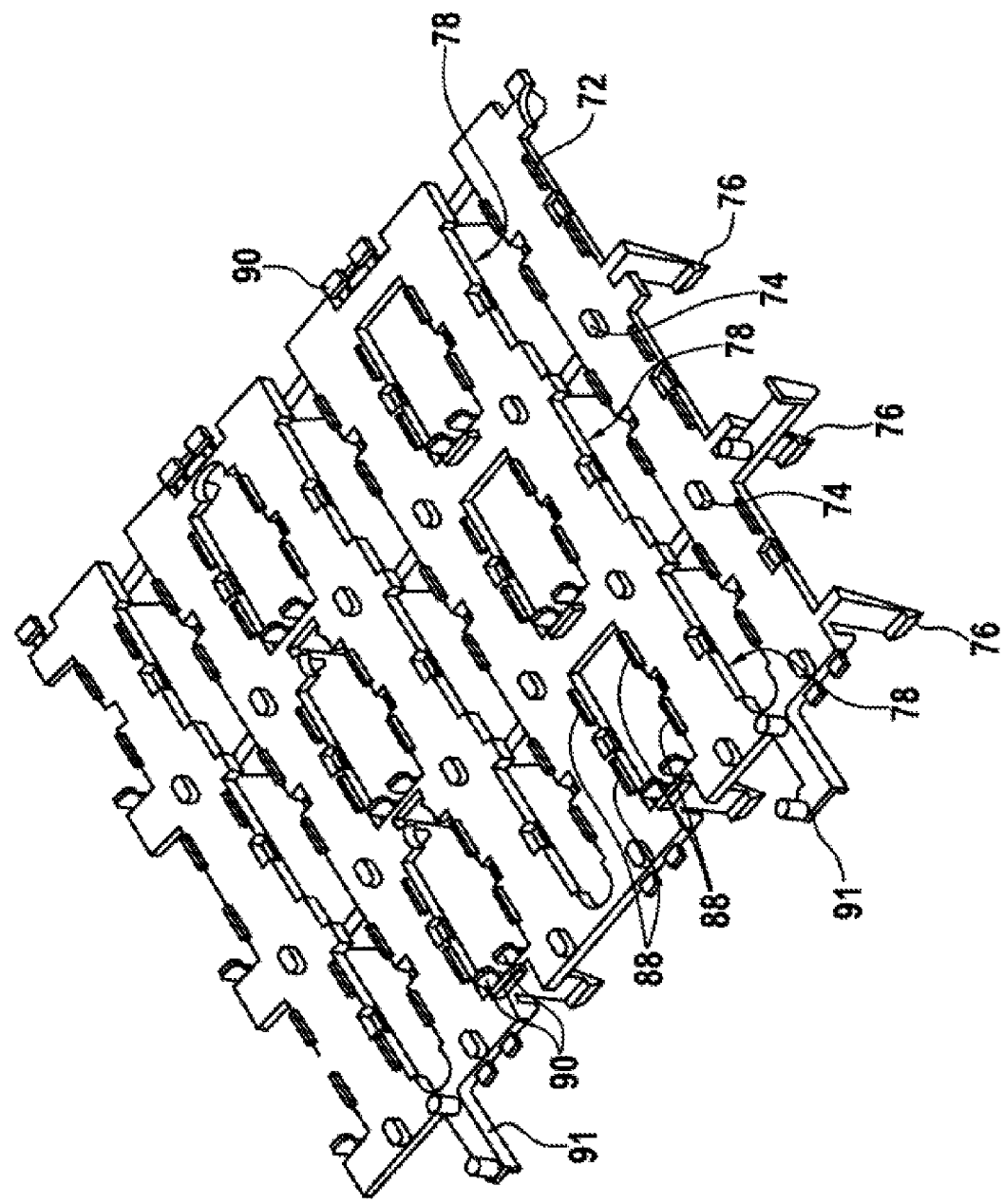
FIG. 8 shows a perspective view of an insulating body of the further exemplary embodiment.
Figure 9:
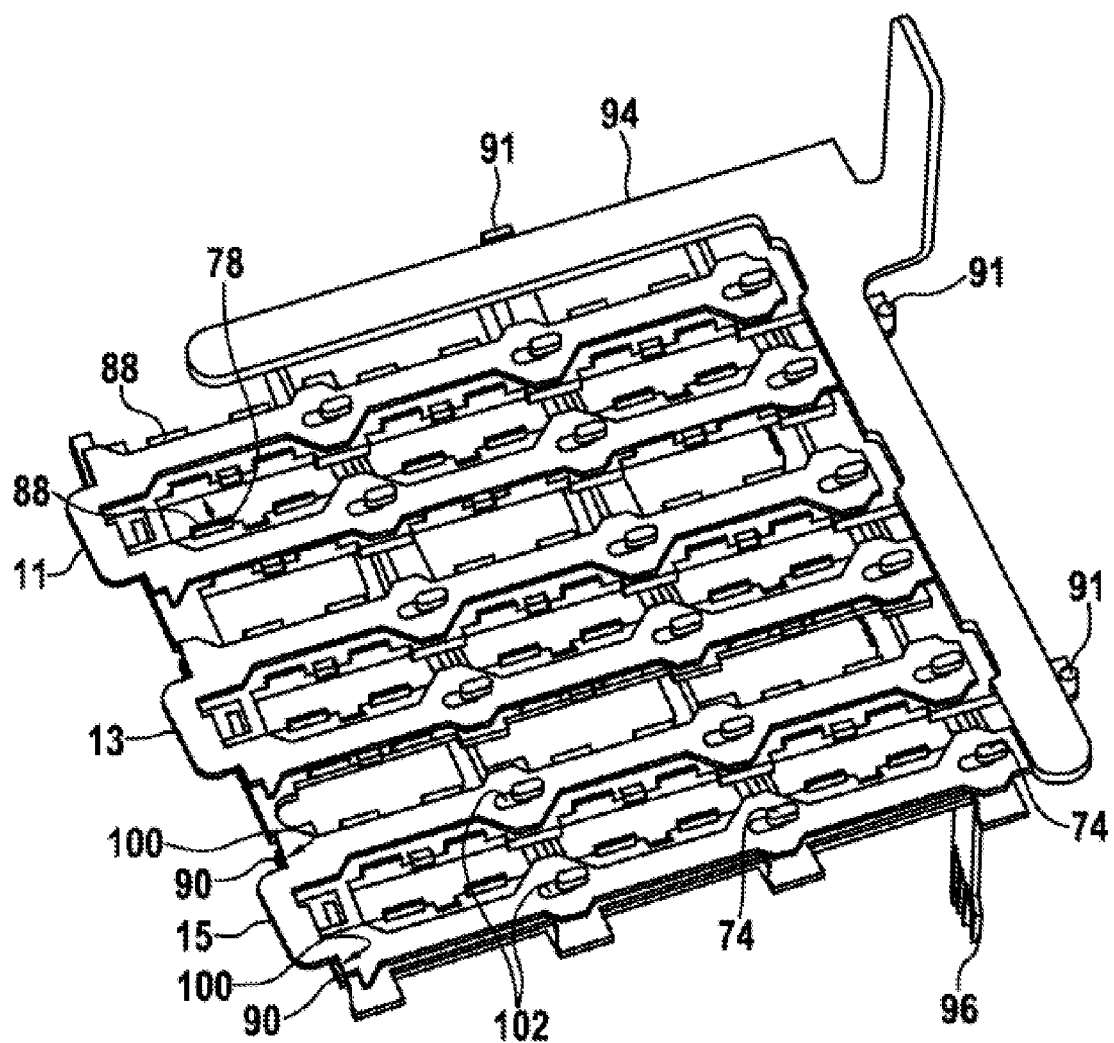
FIG. 9 shows a perspective view of the insulating body of FIG. 8 with assembled first, third and fifth phase.

The phases 11 to 16 shown in FIGS. 6 and 7 are now mounted on an insulating body 72—as described below in conjunction with FIG. 8. The insulating body 72 is preferably constructed in the form of a grid and has appropriate cutouts 78. The cutouts 78 serve to accommodate the legs of the coupling means 31 to 39. As already described in conjunction with FIG. 4, the coupling means 31 to 39 in each case consist of the E-shaped first part 44 and the I-shaped second part 43 which form the corresponding magnet cores. The insulating body 72 also has mountings 91 at the side for a busbar 94. Furthermore, first fixing means 74, which project upwards with respect to the main plane of the insulating body 72, are provided. These first fixing means 74 are in the form of hooks. These hook-shaped first fixing means 74 interact with the openings 102 of the U-shaped phases 11, 13, 15. As six openings 102 are provided for each U-shaped phase 11, 13, 15, there are therefore 18 hook-shaped first fixing means 74 on the insulating body 72 for the three phases 11, 13, 15 which are to be accommodated. These are all oriented such that a movement of the U-shaped phases 11, 13, 15 along their longitudinal axis is possible after the openings 102 have been fitted over the first fixing means 74. This lateral movement of the U-shaped phases 11, 13, 15 is limited at the respective faces by appropriate fixings 90 which interact with the stop surfaces 100 of the U-shaped phases 11, 13, 15. In this state, the hooks of the first fixing means 74 also overlay the busbars of the phases 11, 13, 15 so that these are no longer able to migrate upwards as shown in FIG. 9. Webs 88 are provided on the cutouts 78 of the insulating body 72. The insulating body 72 also has second fixing means 76. These are oriented at right angles to the insulating body surface in the opposite direction to the first fixing means 74 and are in the form of flexible snap connectors. The outwardly projecting connecting surfaces 97 of the phases 11, 13, 15 are now overlaid by a right-angled busbar 94 and connected in an electrically conducting manner. The busbar 94 is located in the mountings 91 of the insulating body 72 and is thus safeguarded against lateral movements.

Figure 10:
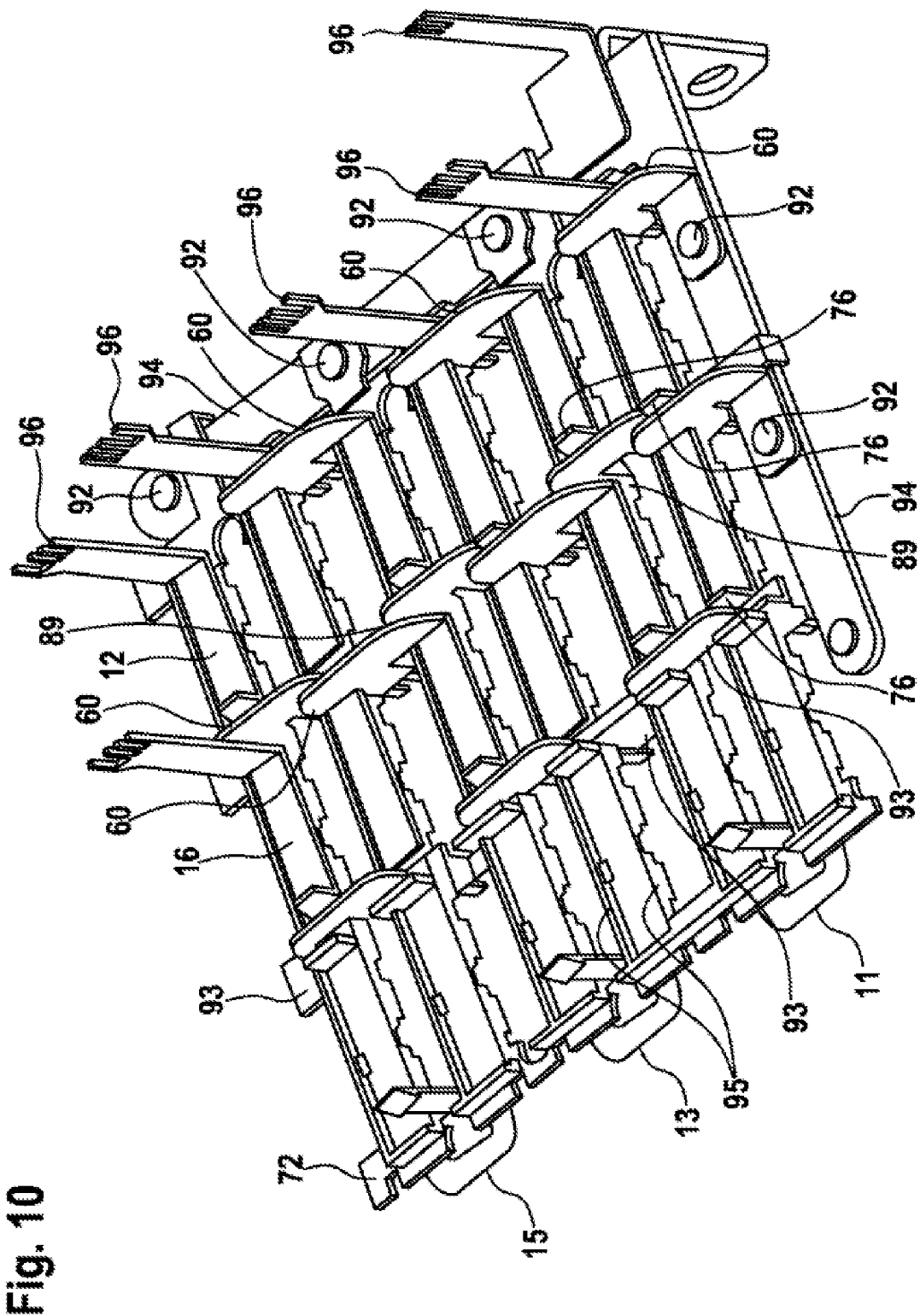
FIG. 10 shows a perspective rear view of the exemplary embodiment of FIGS. 8 and 9 with assembled second and sixth phase.

The insulating body 72 with the underside upwards is shown in the diagram of FIG. 10. The meandering phases 12, 16, 14 are connected to the underside of the insulating body 72. In doing so, the transverse regions of the meandering busbars 12, 14, 16 rest on the webs of the insulating body 72. The webs are safeguarded against lateral movement by appropriate elevations 95. In order to fix the meandering phases 12, 14, 16, the second fixing means 76 or their snap hooks now interact with the upper edges of the fold-down regions 60. On assembly, the snap hooks are pushed to the side and latch in the fold-down region 60 when the meandering phases 11, 14, 16 rest on the insulating body 72. The corresponding connectors 96 of the phases 11 to 16 project at right angles from the underside of the insulating body 72. The connecting surfaces 97 of the meandering phases 12, 14, 16 are electrically conductively connected to the busbar 94. This is carried out, for example, by so-called clinching. Second webs 89 are located between the fold-down regions 60 of two phases, in FIG. 10 the second and the sixth phase 12, 16 by way of illustration. These serve to provide electrical insulation between the two phases 12, 16 so that no short circuit occurs. The second webs 89 are oriented at right angles to the elevations 95.

Figure 11:
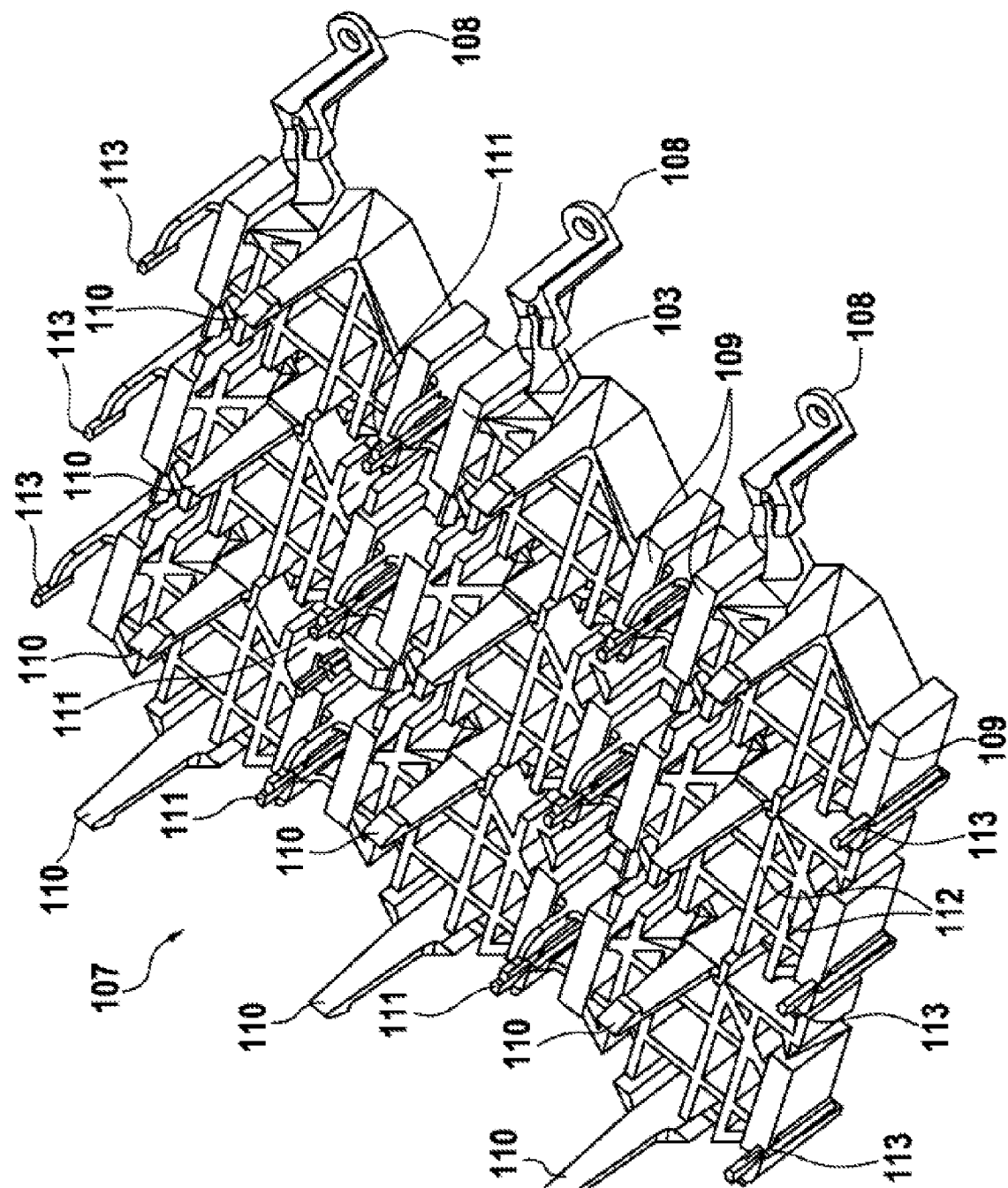
FIG. 11 shows a perspective view of a carrier.

According to the exemplary embodiment of FIG. 11, a flat carrier 107 has a plurality of fixing means 110 which project upwards at right angles to the surface of the carrier 107. These fixing means 110 are in the form of snap connectors or snap hooks. The carrier 107 is bounded at the front and on the face side by finger-shaped side guides 113, which likewise project at right angles to the surface of the carrier 107. These side guides 113 fix the coupling means 31 to 39 at the sides. Finger-shaped guides 111, which likewise project at right angles to the surface of the carrier 107, are provided for further guiding of the coupling means 31 to 39. Rectangular mounting surfaces which are oriented parallel to the surface of the carrier 107 are arranged projecting slightly above ribs 112 and serve as a lateral rest for the coupling means 31 to 39. Here, two laterally arranged mounting surfaces 109, which, however, do not touch the central bottom side surface of the coupling means 31 to 39, are provided for each coupling means 31 to 39, thus enabling an air circulation and corresponding cooling to be achieved in this region. This air circulation is further assisted by the lower lying rib structure of the carrier 107 in this region. Hollow cavities, which, however, are predominantly closed on the underside, are formed between the preferably rectangular ribs 112 or rib structures. Retaining means 108, which are substantially oriented at right angles, project downwards from the underside of the carrier at the side and central regions of the carrier 107 and finish in an eye so that the carrier 107 can be fixed by means of a screw fixing, for example to a printed circuit board.

Figure 12:
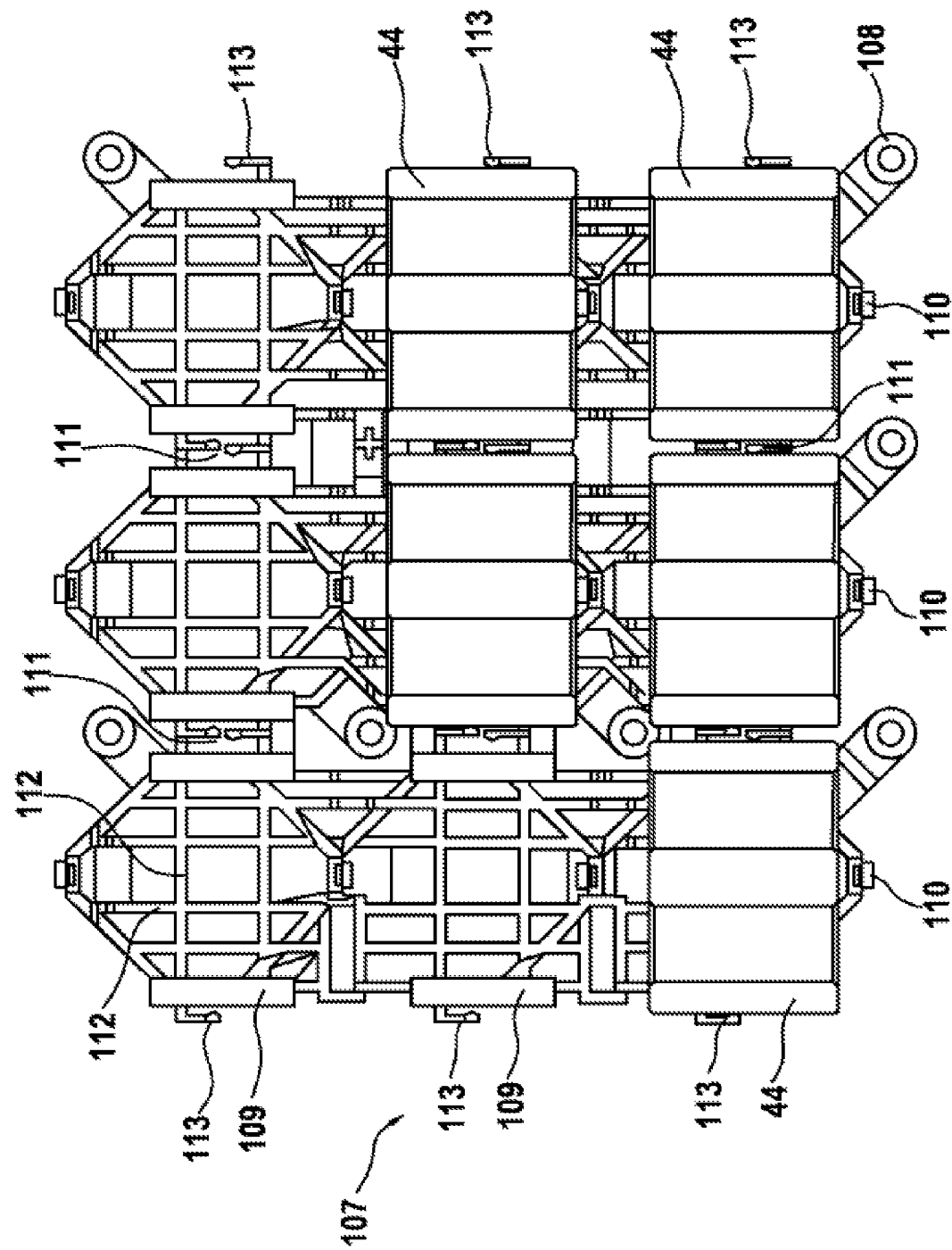
FIG. 12 shows a plan view of the carrier with partially assembled coupling means.

In the plan view of the carrier 107 of FIG. 12, five coupling means 31 to 39 or their E-shaped (bottom) parts 44 are already fitted. The first parts 44 of the coupling means 31 to 39 are laterally fixed by side guide 113 and guide 111, respectively or by two guides 111 at the sides, while a movement of the first parts 44 is permitted in the longitudinal direction for fine positioning and easier overall assembly.

Figure 13:
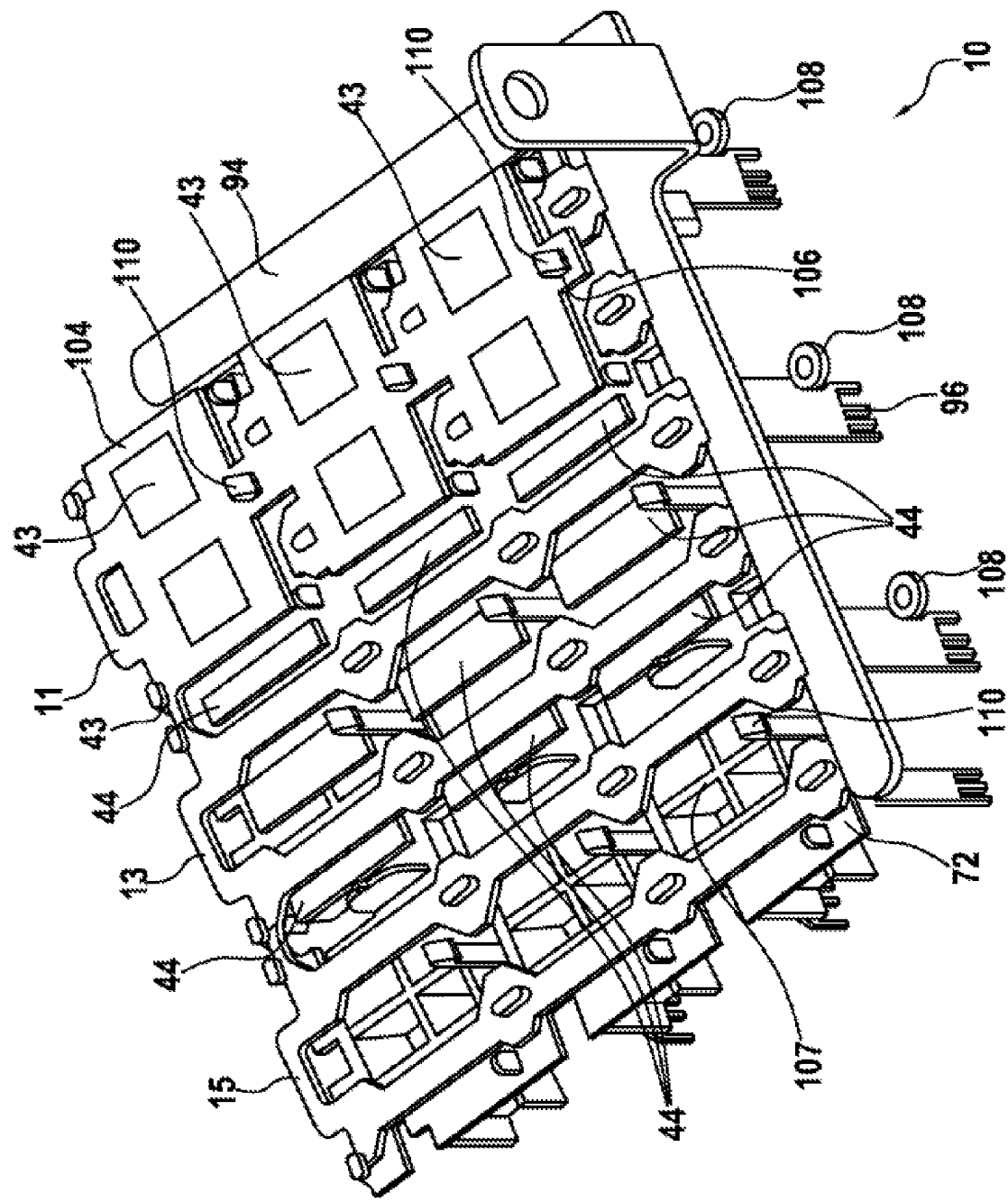
FIG. 13 shows a perspective diagram of the exemplary embodiment of FIGS. 8 to 10 with already completely and partially assembled coupling means.

As can be seen in FIG. 13, the first parts 44 of the coupling means 31 to 39 are now already arranged in the two right-hand rows on the upper side of the carrier 107. All phases 11 to 16 are fixed by means of the insulating body 72 as described in conjunction with FIGS. 8 to 10. The cutouts 78 of the insulating body 72 encompass the upwardly projecting legs of the first parts 44 as shown in the middle row. The upwardly projecting fixing means 110 of the carrier 107 are also fed through these cutouts 78 so that their snap hooks still project above the surface of the legs of the first parts 44. This state is shown in the middle row of the polyphase converter 10 in FIG. 13. In the last row, the plate-shaped second parts 43 already overlay the legs of the first parts 44. The second parts 43 are pressed towards the first parts 44 by a retaining part 104. The retaining part 104 has corresponding openings 106 into which the snap hooks of the fixing means 110 of the carrier 107 engage in each case. The retaining part 104 has three figure-eight-shaped contours, which in each case are connected to one another by a web, for the second part 44 which is to be overlaid.

The exemplary embodiments described work as explained in more detail below. Polyphase converters 10 or DC/DC converters with high powers without special insulation requirements can preferably be realized in polyphase arrangements. As a result, the high input current $I_E$, for example with a magnitude of 300 A, is distributed between the different six phases 11 to 16 with a magnitude of 50 A in each case. A lower AC component can be achieved by the subsequent superimposition of the individual currents to form an output current $I_A$. The corresponding input and output filters according to FIG. 1, shown by way of example as capacitors, can then turn out to be correspondingly small. The phases 11 to 16 are driven sequentially, that is to say successively, so that the switch-on instants are in each case phase-shifted by 60 degrees (or by T/6 in time) (for the six-phase system described) as has already been shown in more detail in FIG. 7. The respective phases 11 to 16 are powered for different durations depending on the desired voltage ratios. The appropriate high-side switch of the switching means 21 to 26 is closed for this purpose. The phase 11 to 16 is not powered when the corresponding low-side switch of the switching means 21 to 26 is closed. Alternatively, those phases 11 to 16 whose switch-off instants are immediately before or afterwards could also be looked upon as adjacent. The corresponding switch-on points would then be chosen variably depending on the desired PWM signal.

One phase 11 is now in each case magnetically coupled to at least three further phases 12, 14, 16, namely in such a way that the direct components of the individual phases are each compensated by other phases as much as possible. This reduces the resulting magnetic field so that the coupling means 31 to 39 and the magnetic circuit only have to be designed substantially for the magnetic field produced by the alternating component. This enables the coupling means 31 to 39, such as coil cores for example, to be made correspondingly small, which leads to significant savings in coupling material, dimensions and costs. This enables the installation space in particular to be greatly reduced.

As well as the two phases which are adjacent with regard to the drive (switch-on and switch-off instants), the third phase to be coupled is now preferably chosen in such a way that a troublesome mutual influencing of the phases is minimized. The selection is made such that an optimum compensation of the DC component is achieved. In doing so, it has been shown that, as well as the adjacent phases (+/−60 degrees phase shift of the switch-on instants for six phases, for the first phase 11 the adjacent phases would therefore be the second phase 12 and the sixth phase 16), the phase with a phase offset of 180 degrees (for the first phase 11 this would be the fourth phase 14) is also particularly suitable, as this results in a very high cancellation of the direct component at this point. The two currents through the coupled phases 11, 14 flow in opposite directions in the seventh coupling means 37. In doing so, the resulting current I res for the magnetization of the coupling means 37 is only initiated by the difference of the currents I res. The direct fields are for the most part canceled. The reduced direct component makes itself positively felt for the geometry of the coupling means 31 to 39, which can now manage with a smaller volume. The coupling shown in FIGS. 1 to 3 has transpired to be particularly suitable for six phases 11 to 16.

Magnetic Coupling

In principle, two phases can be magnetically coupled in that the two phases are fed with antiparallel current feed through a rectangular or annular coupling means 31 to 41. The important thing is that the coupling means 31 to 41 is able to form a magnetic circuit. This is possible with a substantially closed structure which can also include an air gap. Furthermore, the coupling means 31 to 41 is made of a material which has suitable permeability and conducts a magnetic field.

The coupling concept on which FIG. 3 is based can be explained by way of example with reference to FIG. 4. The important thing is that the phases to be coupled—according to FIG. 4, these are first phase 11 and second phase 12—are driven with current flow in opposite directions. The corresponding magnetic fields in each case are substantially canceled with regard to their direct component so that predominantly only the alternating component contributes to generating the magnetic field. As a consequence, the corresponding coupling means 31 to 41 can become smaller and an air gap can be dispensed with.

A possible implementation concept of the exemplary embodiment in FIG. 3 could consist in a printed circuit board, into which the nine coupling means 31 to 39, in this case preferably planar cores, are embedded. All switching means 21 to 26, in each case consisting of high-side and low-side MOSFETs, can be integrated on this printed circuit board as possible exemplary embodiments. The windings for the first, third and fifth phase 11, 13, 15 can also be integrated into this printed circuit board. The other windings of the second, fourth and sixth phase 12, 14, 16 could be realized by means of a more cost-effective punched copper grid. Alternatively, the further windings of the second, fourth and sixth phase 12, 14, 16 could also be integrated in the printed circuit board.

Implementations in which all windings are executed in the form of copper bars or printed circuit boards would also be possible. A further advantage of the construction according to FIG. 3 consists in the short paths of the phases 11 to 16 through all coupling means 31 to 39 and the simple construction without crossovers.

Design of Coupling Means

The coupling means 31 to 41 are means of inductive coupling, such as an iron or ferrite core of a transformer for example, on which the phases 11 to 16 to be coupled generate a magnetic field. The coupling means 31 to 42 closes the magnetic circuit of the two coupled phases 11 to 16.

The choice of material of the coupling means 31 to 38 and the permeability are not so important for the coupling. If no air gap is used, the permeability of the magnetic circuit increases, as a result of which the inductance of the coil becomes larger. As a result, the current rise becomes flatter and the current forms approach the ideal direct current more closely. The closer the curve forms come to a direct current, the smaller is the resulting current difference between the two phases which are fed (in opposite directions) through a core as coupling means 31 to 42. This reduces the outlay on filters. On the other hand, a system without air gap reacts very sensitively to the different currents between the phases 11 to 16. Although the system tends to saturate with small current faults, it is still very stable due to the multiple coupling.

Design of the Phases

Particularly advantageous from the manufacturing point of view is the use of only two geometrical forms of the phases 11 to 16 as shown in plan view in FIG. 5. Here, the one basic form has a U-shaped course and lie in the same plane. The second basic form is substantially rectangular or meandering, likewise lying in the same plane. The sections shown can be integrated as strip conductors in the form of punched grids or in appropriate printed circuit tracks in a printed circuit board. As described in conjunction with FIGS. 3 and 6, the U-shaped phases 11, 13, 15 are arranged with respect to one another so that they lie on a first plane. Correspondingly, the rectangular or meandering phases 12, 14, 16 are also arranged so that they lie on a second plane. These two planes are arranged parallel to and spaced apart from one another so that the phase sections to be coupled in each case can be encompassed by the coupling means 31 to 42.

Basically however, alternative embodiments of the phase forms would also be conceivable without departing from the basic idea of the preferably planar construction.

In particular, certain adaptations are conceivable in order to further reduce the space required by the overall arrangement. An appropriate design of the geometry of the phases 11 to 16 enables the coupling means 31 to 39 to be arranged closer to the respectively adjacent coupling means 31 to 39. This can be achieved, for example, according to the exemplary embodiment of FIG. 6, in that the ends of the busbars of the phases 12, 14, 16 are folded down in fold-down regions 60. As soon as the coupled phase regions (such regions that are encompassed by the coupling means 31 to 39) leave the coupling means 31 to 39, the direction changes compared with that within the coupling means 31 to 42. As a result, the coupling means 39, 35; 35, 34; 32, 38; 38, 33 can move closer together. At the same time, the meandering busbars of the respective phases 12, 14, 16 can also be bent up at the sides.

Construction and Connection Technique

In the exemplary embodiment according to FIGS. 8 to 13, the insulating body 72 undertakes a plurality of functions. On the one hand, it serves to electrically insulate the individual phases 11 to 16 from one another. For this purpose, the meandering phases 12, 14, 16 are mounted on the one side of the insulating body 72 and the U-shaped phases 11, 13, 15 on the opposite side of the insulating body 72. In addition, the second webs 89 prevent the adjacent fold-down regions 60 of different meandering phases 12, 16 from coming into electrical contact with one another, as shown by way of example in FIG. 10 for the phases 12 and 16. Furthermore, the insulating body 72 undertakes the fixing function for the busbars of the phases 11 to 19. As already described, the first fixing means 74, which are in the form of hooks, interact with the openings 102 of the U-shaped phases 11, 13, 15. The second fixing means 76, which are in the form of snap hooks, interact with the edges of the fold-down regions 60 of the meandering phases 12, 14, 16, which edges are oriented at right angles to the main plane. This connects them to the insulating body 72. In addition, lateral fixings 90 or fixing means which interact with the stop surfaces 100 of the U-shaped phases 11, 13, 15 are provided and prevent a further lateral movement of the phases 11, 13, 15. Furthermore, the first webs 88 serve to reliably prevent an electrical contact between the U-shaped phases 11, 13, 15 and the first and/or second part 43, 44 of the coupling means 31 to 39.

The carrier 107 serves to accommodate the first parts 44 of the coupling means 31 to 39. Appropriate mounting surfaces 109 and guides 111 or side guides 113 are provided for this purpose. The guides 111, 113 still allow a movement of the first parts 44 in the longitudinal direction, which, however, is restricted by the fixing means 110 arranged at the face sides. As a result of the ability of the first parts 44 to move in the longitudinal direction, the upwardly projecting legs of the first parts 44 can easily be overlaid by the cutouts of the insulating body 72. The fixing means 110 of the carrier 107 are likewise designed as snap hooks. They serve to fix insulating body 72 and first parts 44 to the carrier 107. This is carried out by means of the further retaining parts 104, in the openings 106 of which the snap hooks engage. This retaining part 104 then presses against the second part 43 of the respective coupling means 31 to 39. As a result of the lower lying rib structure of the carrier 107 compared with the mounting surface 109, an air flow can reach the surface of the coupling means 31 to 39 for cooling purposes. Because the mounting surfaces 109 do not touch the central bottom side surface of the coupling means 31 to 39, an air circulation and corresponding cooling can be achieved in this region. This air circulation is further assisted by the lower lying rib structure of the carrier 107 in this region.

To assemble the polyphase converter, the procedure is as follows: First of all, the insulating body 72 is prepared. The U-shaped phases 11, 13, 15 are then fed to the insulating body 72 so that the openings 102 overlay the first fixing means 74, namely the hooks. The U-shaped phases 11, 13, 15 are then moved sideways until the stop surfaces 100 of the U-shaped phases 11, 13, 15 hit the fixings 90 or fixing means, thus preventing a further movement. The fixings 90 or fixing means are preferably likewise in the form of hooks and also overlay the stop surfaces 100 from above. In this state, the first fixing means 74 also overlay the busbars of the U-shaped phases 11, 13, 15 so that they are no longer able to migrate upwards. The connecting surfaces 97 of the U-shaped phases 11, 13, 15 are now, or in advance, electrically conductively connected to the busbar 94. This electrically conducting connection could be made by means of clinching, for example. The meandering phases 12, 14, 16 are fed to the underside of the insulating body 72, as explained in more detail in conjunction with FIG. 10. During assembly, the fold-down regions 60 push the second fixing means 76 or the snap hooks thereof to the side, which hooks then interact with the side edge of the fold-down regions 60 in the desired end position of the meandering phases 12, 14, 16 to form a secure connection. The connecting surfaces 97 of the meandering phases 12, 14, 16 are then electrically conductively connected to the busbar 94. This could also be carried out by means of clinching, for example.

The further assembly steps can now be seen with reference to FIG. 13. All nine first parts 44 of the coupling means 31 to 39 are now already arranged on the upper side of the carrier 107. In the meantime, all phases 11 to 16 are also fixed by means of the insulating body 72 as described in conjunction with FIGS. 8 to 10. The fitted insulating body 72 is now arranged over the carrier 72 so that the cutouts 78 can be pushed over the upwardly projecting legs of the first parts 44. The upwardly projecting fixing means 110 are also fed through these cutouts 78 so that their snap hooks still project above the surface of the legs of the first parts 44. This state is shown in the middle row of the polyphase converter 10 in FIG. 13.

In a next step, the three upwardly projecting legs of the first part 44 are in each case closed by the plate-shaped second part 43. This is indicated in the right-hand row of FIG. 13. In order to fix the second parts 42, appropriate retaining parts 104 are fitted in a final step. These are in the form of a grid, for example, in each case in the form of a figure eight for each of the three second parts 43 of the right-hand row. These retaining parts 104 are connected to one another by means of webs which have openings 106. These openings 106 serve to accommodate the fixing means 110 of the carrier 107, at the ends of which snap hooks are provided in each case. In this way, the second parts 43 and the insulating body 72 which is provided with the phases 11 to 16 are securely connected to the carrier 107 in that the retaining parts 104 press against the second parts 43 of the coupling means 31 to 39 by means of the snap hooks of the fixing means 110. Spring means made of sheet steel are preferably provided as retaining parts 104 in order to achieve a certain pre-tensioning.

Insulating body 72 and carrier 107 are then connected to a printed circuit board. The retaining means 108 are used for this purpose. In addition, the corresponding connectors 96 are fed through openings of the printed circuit board and further connected in an appropriate manner.

The polyphase converter 10 described is particularly suitable for use in a motor vehicle on-board electrical system in which dynamic load demands in particular are of less significance. The described construction is suitable particularly for such comparatively slow systems.

The invention claimed is:

1. A polyphase converter comprising a plurality of electrical phases (11 to 16) which can each be driven by one of a plurality of switches (21 to 26), and at least one coupling means (31 to 39) magnetically coupling at least one first phase (11) to at least one further phase (12, 14, 16), wherein at least two phases (11, 12) to be coupled are enclosed at least partially by the coupling means (31), and at least one insulating body (72) having at least one fixing means (74, 76, 90) which interacts with at least one of the phases (11 to 16) for fixing purposes to couple the phases (11 to 16) on an upperside and an underside of the insulating body (72).

2. The polyphase converter as claimed in claim 1, characterized in that the insulating body (72) has at least one cutout (78) for feeding through at least one coupling means (31 to 39).

3. The polyphase converter as claimed in claim 1, further comprising a carrier (107), having at least one mounting surface (109) for accommodating the coupling means (31 to 39).

4. The polyphase converter as claimed in claim 3, characterized in that the mounting surface (109) is designed so that the coupling means (31 to 39) only partially rests on the carrier (107).

5. The polyphase converter as claimed in claim 3, characterized in that the carrier (107) has at least one fixing means (108, 110) for fixing the carrier (107) to the coupling means (31 to 39), to the insulating body (72), or to a printed circuit board.

6. The polyphase converter as claimed in claim 3, characterized in that the carrier (107) has at least one guide means (111, 113) which interacts with the coupling means (31 to 39) for guidance purposes.

7. The polyphase converter as claimed in claim 5, characterized in that the fixing means (108, 110) of the carrier (107) interacts with a retaining part (104) for fixing the coupling means to the carrier (107).

8. The polyphase converter as claimed in claim 1, characterized in that at least two phases (11, 13, 15) are arranged spatially in a first plane on the upper side of the carrier (72) and in that at least two further phases (12, 14, 16) run spatially in a second plane on the underside of the carrier (72).

9. The polyphase converter as claimed in claim 1, characterized in that at least one phase (11 to 16) is designed in a U-shape, as a rectangle and/or in a meandering fashion.

10. The polyphase converter as claimed in claim 1, characterized in that the phase (11, 13, 15) arranged on the one side of the carrier (72) is designed in a U-shape and the phase (12, 14, 16) arranged on the opposite side of the carrier (72) is designed in a meandering fashion.

11. The polyphase converter as claimed in claim 1, characterized in that the fixing means (74, 76, 90) has at least one hook which interacts with at least one opening (102) of the phase (11 to 16).

12. The polyphase converter as claimed in claim 1, characterized in that a fixing means (76) interacts with a side edge on a fold-down region (60) of the phase (12, 14, 16).

13. The polyphase converter as claimed in claim 1, characterized in that the insulating body (72) has webs (88, 89) for electrically insulating the phases (11 to 16) from one another and with respect to the coupling means (31 to 39).

14. The polyphase converter as claimed in claim 13, characterized in that the web (89) is arranged between two fold-down regions (60) of two adjacent phases (12, 16).

15. The polyphase converter as claimed in claim 1, characterized in that the fixing means (90) of the insulating body (72) interacts with at least one stop surface (100) of the phase (11, 13, 15).

16. The polyphase converter as claimed in claim 8, wherein three phases (11, 13, 15) are arranged spatially in the first plane on the upper side of the carrier (72).

17. The polyphase converter as claimed in claim 8, wherein three phases (11, 13, 15) are arranged spatially in the second plane on the underside of the carrier (72).

18. The polyphase converter as claimed in claim 1, characterized in that the fixing means (74, 76, 90) has at least one hook which interacts with one side edge (60, 100) of the phase (11 to 16).

* * * * *